(No Model.) 2 Sheets—Sheet 1.
C. G. CANFIELD.
VEHICLE WHEEL.
No. 363,587. Patented May 24, 1887.
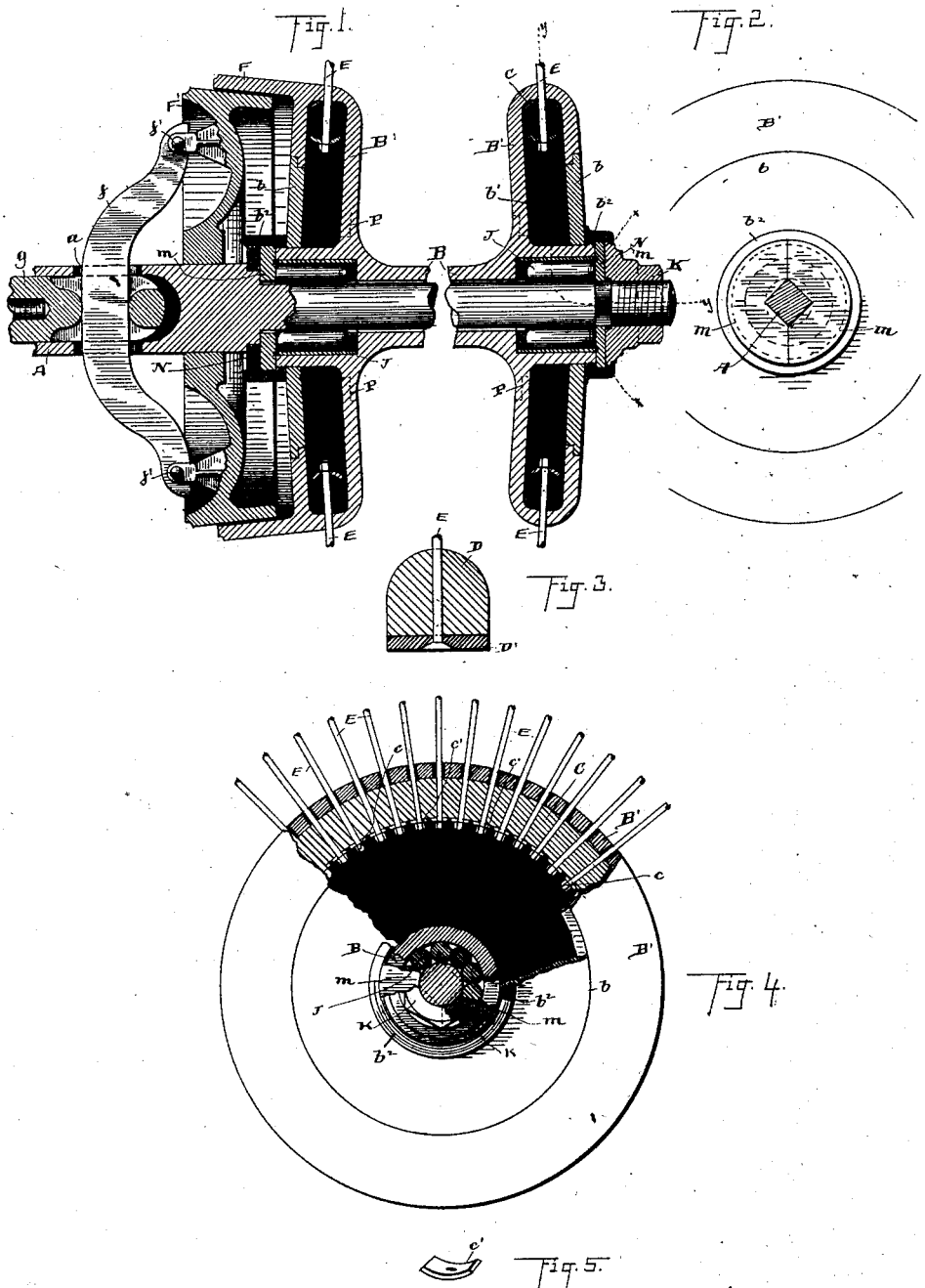
WITNESSES
Chas G. Canfield INVENTOR
By Leggett & Leggett
Attorneys (No Model.)
2 Sheets—Sheet 2.

C. G. CANFIELD.
VEHICLE WHEEL.

No. 363,587. Patented May 24, 1887.

WITNESSES

Chas G. Canfield, INVENTOR

UNITED STATES PATENT OFFICE.

CHARLES G. CANFIELD, OF CLEVELAND, OHIO.

VEHICLE-WHEEL.

SPECIFICATION forming part of Letters Patent No. 363,587, dated May 24, 1887.

Application filed February 4, 1887. Serial No. 226,532. (No model.)

*To all whom it may concern:*

Be it known that I, CHARLES G. CANFIELD, of Cleveland, in the county of Cuyahoga and State of Ohio, have invented certain new and useful Improvements in Vehicle-Wheels; and I do hereby declare the following to be a full, clear, and exact description of the invention, such as will enable others skilled in the art to which it pertains to make and use the same.

My invention relates to improvements in vehicle-wheels in which rubber rings are inclosed in annular chambers of the hub and metal spokes enter loosely through the periphery of the hub and pass through and are secured by the rubber rings, to the end that the wheel is made elastic at the hub. The inner end of the hub has a conical flange, and a corresponding-shaped friction-disk is made to operate therein, forming a brake, the disk being operated by mechanism extending through a hollow axle, to the end that the brake mechanism is in the main concealed, and therefore does not disfigure the wheel or carriage.

With these objects in view my invention consists in certain features of construction and in combination of parts, hereinafter described, and pointed out in the claims.

Figure 6:
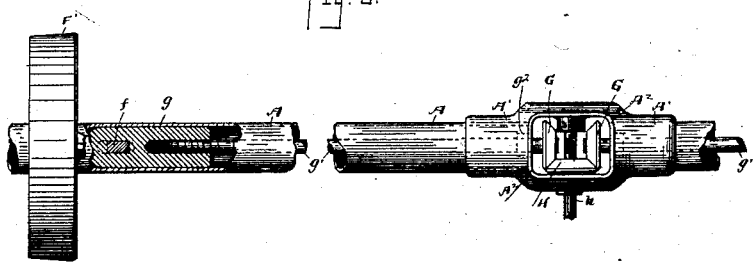
Figure 7:
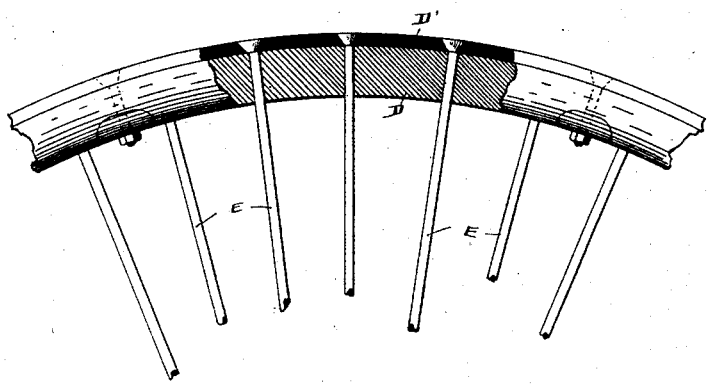

In the accompanying drawings, Figure 1 is an elevation in longitudinal section of the hub of the wheel, showing also a portion of the brake mechanism. Fig. 2 is a transverse section on the line of $xx$, Fig. 1. Fig. 3 is a transverse section of the felly and tire, showing also a portion of one of the spokes. Fig. 4 is a transverse section on the line of $yy$, Fig. 1. Fig. 5 is a view in perspective of one of the spoke-washers. Fig. 6 is a plan, partly in section, of a portion of the axle. Fig. 7 is a side elevation, partly in section, of a portion of the rim of the wheel.

A represents the axle, on which is mounted a hub, the latter consisting, essentially, of a sleeve, B, connecting and preferably integral with two hollow annular flanges, B', the latter being U-shaped in cross-section. Removable heads $b$ give access to the chamber $b'$ inside the respective flanges B'. The bore of the hub may, if preferred, be enlarged to make room for the anti-friction rolls J, as shown in Figs. 1 and 4. In each chamber $b'$, and fitting the inner surface of the walls around the periphery thereof, is a rubber ring, C.

Small metal spokes E pass through the fellies D and tire D', with countersunk heads engaging the latter. Alternate spokes enter the respective flanges B', passing loosely through holes in the periphery of the flanges. The spokes pass centrally through the rubber rings C, and are secured inside by nuts $c$ and washers $c'$, the latter having concaved surfaces to fit the rubber rings. In place of separate washers for each spoke, two or more washers may be made integral; or, if preferred, the washers of each rubber ring may all be connected, forming a continuous band or washer, in which case the holes through the periphery of the flanges B', where the spokes enter, would have to be elongated in a circumferential direction of the flanges. The rubber rings perform the functions of springs for the vehicle and cushions to prevent the vibration of the parts. The heads $b$ are preferably secured by nuts $b^2$, that screw onto the projecting ends of the sleeve B.

The nuts $b^2$ should extend over the edges, respectively, of the nut K and collar N. Washers $m$ are arranged at either end of the hub to receive the wear. The outside washer may embrace a square portion of the axle to prevent the washer from turning. A collar, N, is shrunk onto the axle to support the rear washer $m$. A conical flange, F, with the base thereof presenting outward from the wheel and toward the vehicle, is connected and preferably integral with the inside of the hub. The bore of this flange corresponds with the conical-faced friction-disk F', that is mounted on the axle, the disk and flange forming a brake for the wheel. Suitable mechanism is provided for reciprocating the disk on the axle in operating the brake, and is preferably as follows: A cross-bar, $f$, passes through a slot, $a$, in the axle and through a plunger, $g$, that operates loosely inside the axle, the said cross-bar fitting snugly in the plunger. The cross-bar is secured at the ends between ears $f'$ that project in pairs from the rear of the disk F'. With this construction the disk is moved with and held from turning by the cross-bar. The central portion of the axle is hollow and made in two pieces, that are connected by a yoke, A'.

Rods $g'$, located in the cavity of the axle, are screw-threaded at the outer end and engage threaded holes, respectively, in the plunger $g$. A collar, $g^2$, and the hub of the gear G, both being secured to the inner end of the rod $g'$ by engaging opposite sides of the plate $A^2$, (the latter being rigidly secured to the yoke,) hold the rod from moving endwise. The gears G, that are thus located facing each other, are engaged in common by a gear, H. This latter gear it mounted on a spindle, $h$, that is journaled in the yoke, and this spindle may extend in any direction forward, rearward, or vertically, as may be required, and according as the yoke is set on the axle. By rotating the spindle $h$ the rods $g'$ are rotated, and by means of the screw-threads on these rods, the one being right-handed and the other left-handed, engaging the plungers $g$ the latter are moved endwise and carry the cross-bar, that in turn carries the disk F' to engage or disengage the conical flanges F, according to the direction that the spindle $h$ is turned. The flange F externally should, to give the best appearance, be of the same size as the contiguous flange B'.

With such construction, the disk F' being nearly concealed by the flange F, there is little about the brake mechanism that is visible and nothing cumbersome or unsightly, as with the ordinary brakes in use. In case difficulty is had in casting the hub with the flanges B' integral, the outer portion of these flanges may be cast separate and the parts riveted together, such division being made, for instance, on the irregular dotted line P.

What I claim is—

1. In a vehicle-wheel, the combination, with a hub having an annular hollow flange, and a rubber ring located in the cavity of the flange, of spokes passing through the walls of the flange and secured to the rubber ring, substantially as set forth.

2. In a vehicle-wheel, the combination, with a hub having annular hollow flanges, and springs located in the cavity of the flanges, of metal spokes arranged to pass through the tire and felly of the wheel-rim and to pass loosely through the walls of the flanges, the spokes being secured, respectively, to the said springs, the parts being arranged substantially as described.

3. The combination, with a vehicle-wheel having a conical flange or rim connected with the hub of the wheel, of a friction-disk to operate in the conical rim, the two parts forming a brake, and a screw for moving the friction-disk toward and away from the conical flange, the parts being arranged substantially as set forth.

4. The combination, with a vehicle-wheel, a conical rim forming a part of the wheel-hub, of a friction-disk for engaging the conical rim to form a brake, a hollow axle, and a screw-rod operating in a cavity of the axle, said screw-rod engaging suitable mechanism connected with the friction-disk for operating the same, the parts being arranged substantially as described.

In testimony whereof I sign this specification, in the presence of two witnesses, this 20th day of February, 1886.

CHARLES G. CANFIELD.

Witnesses:
 CHAS. H. DORER,
 ALBERT E. LYNCH.